US011015817B2

(12) United States Patent
Klok et al.

(10) Patent No.: US 11,015,817 B2
(45) Date of Patent: May 25, 2021

(54) CONTINUOUS FIBER REINFORCED THERMOPLASTIC MOLDED OVEN DOOR

(71) Applicant: KONINKLIJKE FABRIEK INVENTUM B.V., Nieuwegein (NL)

(72) Inventors: Martijn Klok, Boskoop (NL); Job Epskamp, Utrecht (NL)

(73) Assignee: Ksninklijke Fabriek Inventum B.V., Nieuwegein (NL)

( * ) Notice: Subject to any disclaimer, the term of this patent is extended or adjusted under 35 U.S.C. 154(b) by 168 days.

(21) Appl. No.: 16/265,325

(22) Filed: Feb. 1, 2019

(65) Prior Publication Data
US 2020/0248907 A1   Aug. 6, 2020

(51) Int. Cl.
*F24C 15/02* (2006.01)
*B64D 11/00* (2006.01)

(52) U.S. Cl.
CPC ............ *F24C 15/024* (2013.01); *B64D 11/00* (2013.01)

(58) Field of Classification Search
CPC .................................................... F24C 15/024
USPC ........................................................ 126/197
See application file for complete search history.

(56) References Cited

U.S. PATENT DOCUMENTS

| | | | | |
|---|---|---|---|---|
| 2,939,452 | A * | 6/1960 | Kamin | F24C 15/02 126/190 |
| 9,850,701 | B1 * | 12/2017 | Arway | E06B 3/827 |
| 2002/0074916 | A1 * | 6/2002 | Wenning | B32B 27/34 312/406 |
| 2012/0031389 | A1 * | 2/2012 | McMaster | F24C 15/04 126/200 |
| 2013/0293076 | A1 * | 11/2013 | Karandikar | H02B 1/46 312/296 |
| 2015/0338158 | A1 * | 11/2015 | Maas | F25D 29/005 312/405 |
| 2016/0327279 | A1 * | 11/2016 | Bhogal | A23L 5/15 |
| 2018/0017267 | A1 * | 1/2018 | Raggi | F24C 15/022 |

\* cited by examiner

*Primary Examiner* — Avinash A Savani

(57) ABSTRACT

An aircraft oven body is disclosed. In embodiments, the aircraft galley oven includes an oven body. The aircraft oven body also includes an oven door hingedly coupled to the oven body. In embodiments, the oven door includes a first continuous fiber reinforced thermoplastic (CFRTP) sheet defining at least a portion of an exterior surface of the oven door. A second CFRTP sheet may define at least a portion of an interior surface of the oven door. The oven door further includes one or more ribbed structures disposed on at least one of the first CFRTP sheet or the second CFRTP sheet. In embodiments, the oven door further includes an oven door latching mechanism disposed within one or more recesses within the one or more ribbed structures. The oven door also includes an insulating layer coupled to at least one of the one or more ribbed structures.

20 Claims, 10 Drawing Sheets

CONTINUOUS FIBER REINFORCED THERMOPLASTIC MOLDED OVEN DOOR

BACKGROUND

There is a continuous need in the art for appliances with improved thermal characteristics. For example, ovens with improved insulating and thermal retention characteristics are desirable. In the case of aircraft galley inserts, improvements to aircraft appliances must not only improve the thermal characteristics of the appliances, but must also conform to weight saving requirements for the aircraft. Therefore, it would be desirable to provide a system and method that address one or more of the shortfalls identified above.

SUMMARY

In one aspect, embodiments of the inventive concepts disclosed herein are directed to an aircraft galley oven. In embodiments, the aircraft galley oven includes an oven body. The aircraft oven body also includes an oven door hingedly coupled to the oven body. In embodiments, the oven door includes a first continuous fiber reinforced thermoplastic (CFRTP) sheet defining at least a portion of an exterior surface of the oven door. The oven door further includes a second CFRTP sheet defining at least a portion of an interior surface of the oven door, and one or more ribbed structures disposed on at least one of the first CFRTP sheet or the second CFRTP sheet. In embodiments, the oven door further includes an oven door latching mechanism disposed within one or more recesses within the one or more ribbed structures. The oven door also includes an insulating layer coupled to at least one of the one or more ribbed structures.

In one aspect, embodiments of the inventive concepts disclosed herein are directed to an aircraft galley device. In embodiments, the aircraft galley device includes an oven door hingedly couplable to an oven body. In embodiments, the oven door includes: a first continuous fiber reinforced thermoplastic (CFRTP) sheet; one or more ribbed structures disposed on the first CFRTP sheet; a second CFRTP sheet coupled to the one or more ribbed structures; and an oven door latching mechanism disposed within one or more recesses within the one or more ribbed structures, the oven door latching mechanism including a primary latching mechanism comprising a single primary latch rod configured to engage a latching site of the oven body.

In another aspect, embodiments of the inventive concepts disclosed herein are directed to an appliance door. In embodiments, the appliance door includes an appliance door hingedly couplable to an appliance body. In embodiments, the appliance door includes a first continuous fiber reinforced thermoplastic (CFRTP) sheet. In further embodiments, the appliance door includes one or more ribbed structures disposed on the first CFRTP sheet. The appliance door also includes an appliance door latching mechanism disposed within one or more recesses within the one or more ribbed structures. In embodiments, the appliance door further includes an insulating layer coupled to the one or more ribbed structures, and a second CFRTP sheet coupled to the insulating layer.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
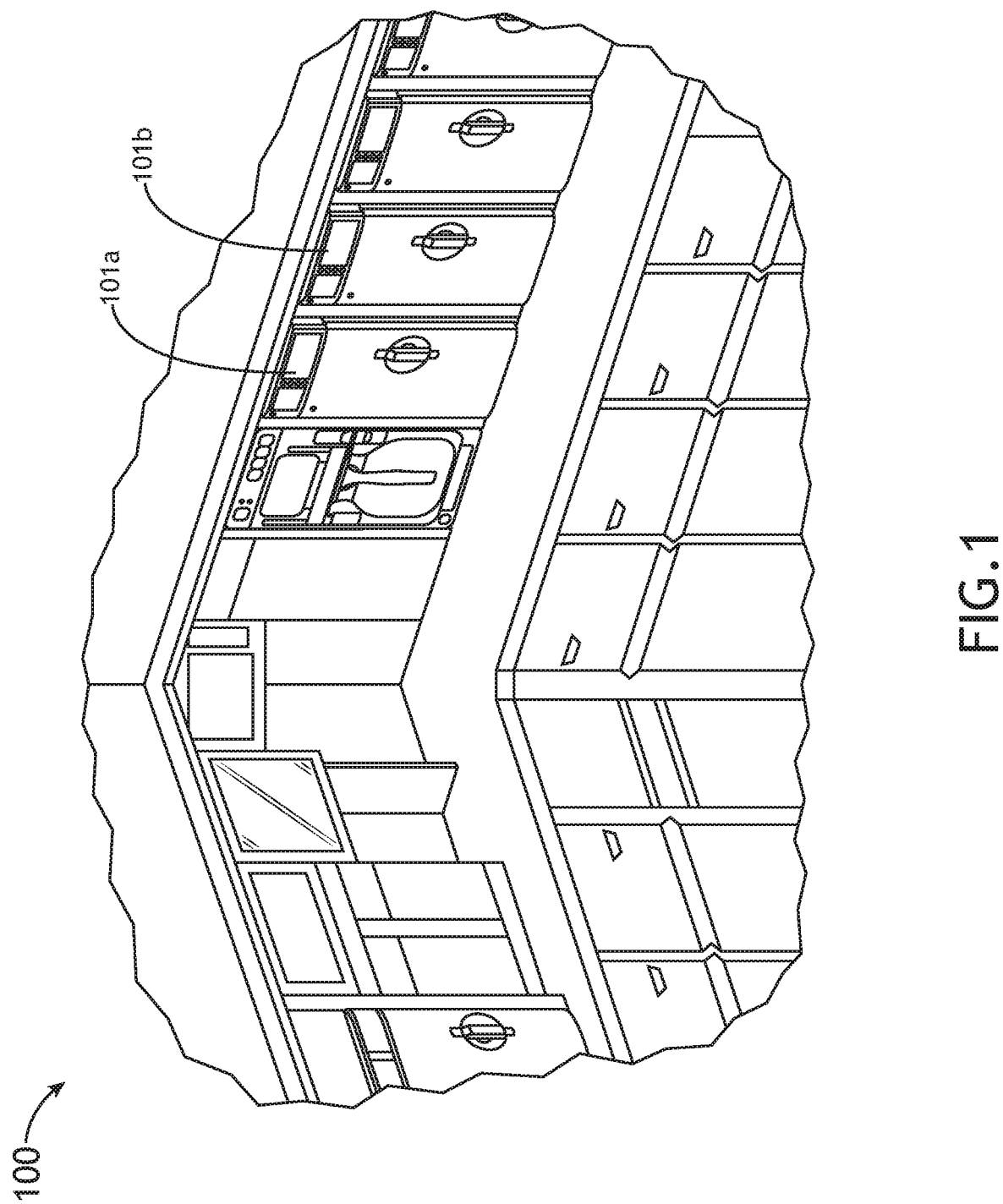
FIG. 1 illustrates an aircraft environment including aircraft-compliant appliances, in accordance with an example embodiment of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, directional terms such as "top," "bottom," "over," "under," "upper," "upward," "lower," "down," "downward," and similar terms, are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Additionally, as used herein, a letter following a reference numeral is intended to reference an embodiment of the feature or element that may be similar, but not necessarily identical, to a previously described element or feature bearing the same reference numeral (e.g., 1, 1A, 1B). Such shorthand notations are used for purposes of convenience only, and should not be construed to limit the inventive concepts disclosed herein in any way unless expressly stated to the contrary.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to appliances constructed with continuous fiber reinforced thermoplastics (CFRTP). Additional embodiments of the present disclosure are directed to oven doors comprising ribbed structures injection molded onto CFRTP sheets. Additional embodiments of the present disclosure are directed to CFRTP oven doors with oven door latching mechanism components embedded within ribbed structures disposed on CFRTP sheets. Additional embodiments of the present disclosure are directed to an oven door including a primary latching mechanism including a single primary latch rod, and a secondary latching mechanism including a single secondary latch rod.

Referring generally to FIGS. 1-7, an appliance door formed from continuous fiber reinforced thermoplastic (CFRTP) sheets is described, in accordance with example embodiments of the present disclosure.

FIG. 1 illustrates an aircraft environment 100 including aircraft-compliant appliances, in accordance with an example embodiment of the present disclosure. More specifically, FIG. 1 illustrates an aircraft environment 100 (e.g., aircraft galley) including an aircraft-compliant coffee maker, and a plurality of aircraft complaint ovens 101a, 101b.

Although example embodiments of the present disclosure are shown and described in an aircraft environment, the inventive concepts of the present disclosure may be configured to operate in any type of appliance in the art. For example, the embodiments of the present disclosure may be incorporated into any appliance known in the art. In the interest of simplicity and to most clearly define the inventive concepts of the present disclosure, embodiments may be described throughout the present disclosure in an aircraft environment. However, these references are not to be regarded as limiting. Thus, references to "aircraft," "airplanes," "avionics," and like terms should not be interpreted as a limitation on the present disclosure, unless noted otherwise herein.

It is further noted herein that, where the environment includes an aircraft environment, it is noted herein the embodiments of the present disclosure may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Figure 2A:
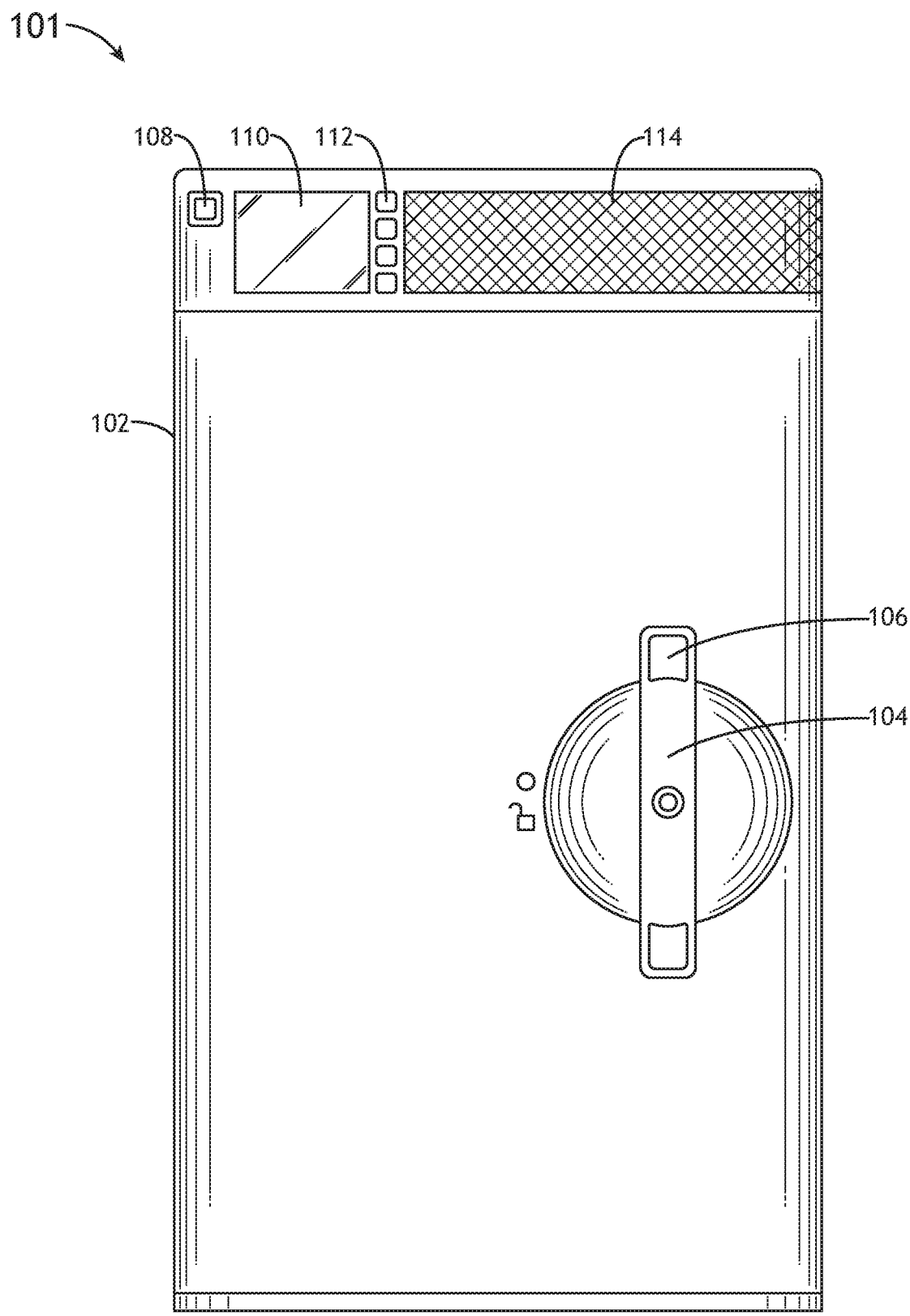
FIG. 2A illustrates a front elevation view of an aircraft galley oven, in accordance with an example embodiment of the present disclosure.

FIG. 2A illustrates a front elevation view of an aircraft galley oven 101, in accordance with an example embodiment of the present disclosure. More specifically, FIG. 2A illustrates an oven door 102 of an aircraft galley oven 101. The oven door 102 may include, but is not limited to, a primary latch handle 104, a secondary latch knob 106, one or more lights 108, a display 110, one or more buttons 112, and one or more vent structures 114.

Although example embodiments of the present disclosure are shown and described in the context of an aircraft galley oven 101, this is not a limitation of the present disclosure, unless noted otherwise herein. In this regard, it is contemplated that inventive concepts of the present disclosure may be applied to various other aircraft-compliant appliances and non-aircraft-compliant appliances. For example, embodiments of the present disclosure may be applied to aircraft-compliant microwaves. By way of another example, embodiments of the present disclosure may be applied to non-aircraft-compliant commercial or residential appliances.

Figure 2B:
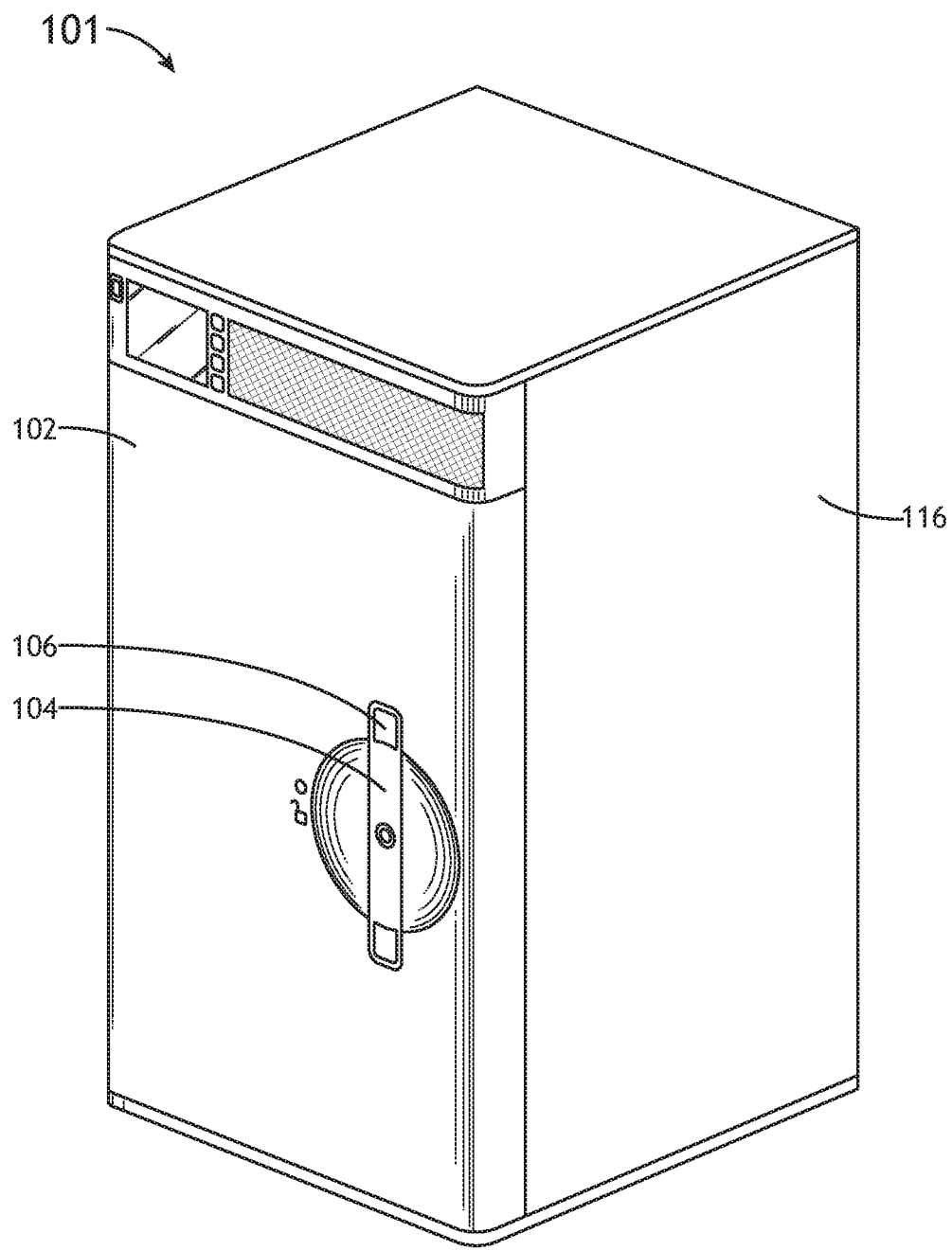
FIG. 2B illustrates a perspective view of an aircraft galley oven in a closed position, in accordance with an example embodiment of the present disclosure.
Figure 2C:
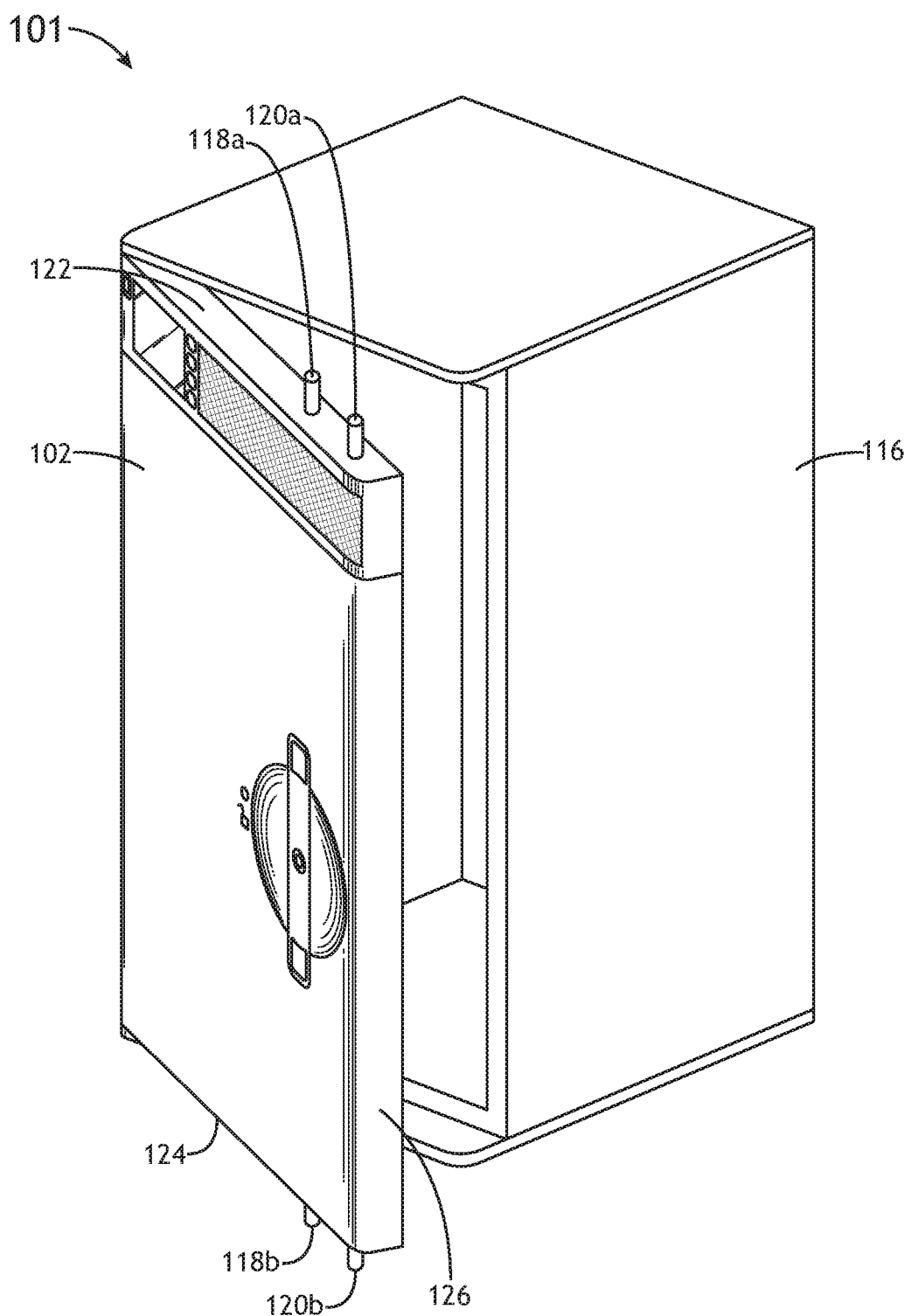
FIG. 2C illustrates a perspective view of an aircraft galley oven in an open position, in accordance with an example embodiment of the present disclosure.

FIG. 2B illustrates a perspective view of an aircraft galley oven 101 in a closed position, in accordance with an example embodiment of the present disclosure. FIG. 2C illustrates a perspective view of an aircraft galley oven 101 in an open position, in accordance with an example embodiment of the present disclosure.

In embodiments, the oven door 102 may be configured to be couplable to an oven body 116. For example, as shown in FIGS. 2B-2C, the oven door 102 may be hingedly coupled to the oven body 116 such that the oven door 102 may be actuated between a closed position (FIG. 2B) and an open position (FIG. 2C). In additional embodiments, oven door 102 may include a latching mechanism configured to retain the oven door 102 in the closed position. Traditional aircraft galley oven doors include a latching mechanism which includes a primary latching mechanism and a secondary latching mechanism.

For example, as shown in FIG. 2C, traditional aircraft galley doors may include a primary latching mechanism including a first primary latch rod 118a and a second primary latch rod 118b. Traditional aircraft galley doors may further include a secondary latching mechanism including a first secondary latch rod 120a and a second secondary latch rod 120b. The latch rods of the primary latching mechanism and the secondary latching mechanism may be configured to engage latching sites on the oven body 116 in order to detachably retain the oven door 102 in a closed position. The primary latch handle 104 may be configured to actuate the first and second primary latch rods 118a, 118b, and the secondary latch knob 106 may be configured to actuate the first and second secondary latch rods 120a, 120b in order to transition the oven door 102 from a closed position to an open position. As shown in FIG. 2C, the first primary latch rod 118a and the first secondary latch rod 120a may be configured to engage latching sites disposed on the oven body 116 proximate to a top surface 122 of the oven door 102. Conversely, the second primary latch rod 118b and the second secondary latch rod 120b may be configured to engage latching sites disposed on the oven body 116 proximate to a bottom surface 124 of the oven door 102. It is further noted, however, that the latch rods 118, 120 may be configured to engage latching sites disposed on the oven body 116 proximate to a side surface 126 of the oven door. Latching sites disposed on the oven body 116 may include any latching sites known in the art for receiving latch rods 118, 120 and retaining the oven door 102 in a closed position including, but not limited to, one or more holes, one or more detents, one or more inclined planes, and the like.

Figure 3:
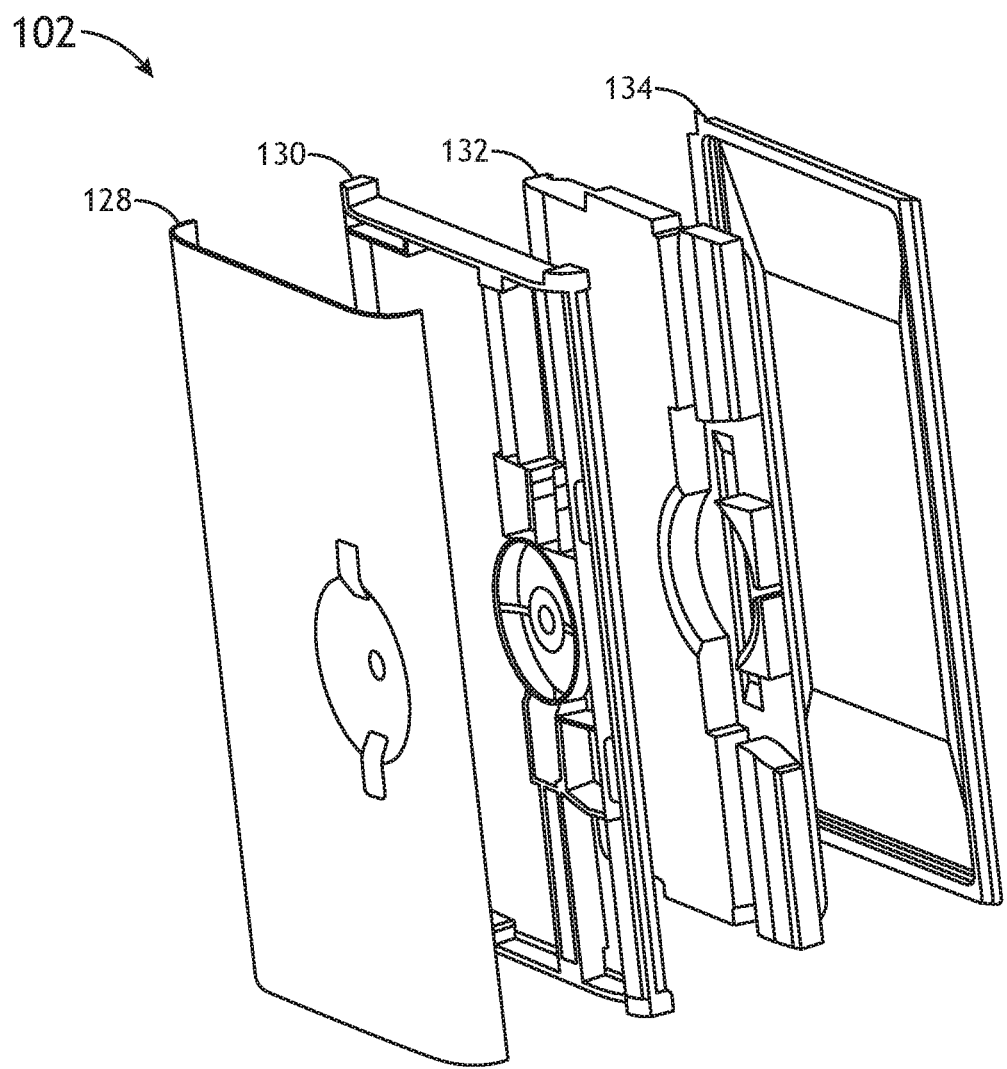
FIG. 3 illustrates an exploded view of an oven door including multiple layers, in accordance with one or more embodiments of the present disclosure.

FIG. 3 illustrates an exploded view of an oven door 102 including multiple layers, in accordance with one or more embodiments of the present disclosure. More specifically, FIG. 3 illustrates an oven door 102 produced with continuous fiber reinforced thermoplastic (CFRTP) sheets. In this regard, oven door 102 may include, but is not limited to, a first CFRTP sheet 128, one or more ribbed structures 130, an insulating layer 132, and a second CFRTP sheet 134.

In embodiments, continuous fiber reinforced thermoplastics (CFRTP) sheets 128, 134 may include sheets of thermoplastic resins (e.g., polyetherimide thermoplastic) including continuous glass fibers and/or carbon fibers. The continuous fibers may allow the first CFRTP sheet 128 and the second CFRTP sheet 134 to be extremely strong. The first CFRTP sheet 128 and the second CFRTP sheet 134 may be fabricated into preformed, bespoke shapes and sizes using one or more thermoforming processes. The CFRTP sheets 128, 134 may be fabricated to a pre-selected thickness. For example, the first CFRTP sheet 128 and the second CFRTP sheet 134 may be formed such that the sheets are between 0.4 mm to 5.5 mm thick. It is noted herein that first CFRTP sheet 128 and second CFRTP sheet 134 may be formed from a wide range of continuous fiber reinforced thermoplastics. For example, the first CFRTP sheet 128 and the second CFRTP sheet 134 may be formed with CETEX (e.g., thermoformed CETEX sheets).

As shown in FIG. 3, the first CFRTP sheet 128 may define an exterior surface of oven door 102, and the second CFRTP sheet 134 may define an interior surface of oven door 102. It has been found that utilizing CFRTP sheets (e.g., first CFRTP sheet 128 and second CFRTP sheet 134) allows for the creation of an oven door 102 produced with a sandwiched construction which is much stiffer and stronger than traditional oven doors.

In embodiments, the first CFRTP sheet 128 and/or the second CFRTP sheet 134 may include one or more cut-outs configured to receive one or more components of the oven 101. For example, as shown in FIG. 2A, the first CFRTP sheet 128 defining at least a portion of an exterior surface of oven door 102 may include one or more cut-outs configured to receive various components of the oven 101 including, but not limited to, the primary latch handle 104, the secondary latch knob 106, the one or more lights 108, the display 110, the one or more buttons 112, the one or more vent structures 114, and the like. It is contemplated herein that the first CFRTP sheet 128 may be preformed to include one or more cut-outs such that various components of oven (or other appliance) which are disposed within the oven 101 may be visible to a user at an exterior surface of the oven 101. For example, the display 110 may be disposed within one or more cut-outs of the first CFRTP sheet 128 such that the display 110 is configured to display one or more characteristics of the oven 101 to a user including, but not limited to, a timer of the oven 101, the internal temperature of the oven 101, the operating state of the oven 101 (e.g., "on," "off"), and the like. It is further noted, however, that this is not a limitation of the present disclosure, unless noted otherwise herein. In this regard, the various components of the oven 101 (e.g., one or more lights 108, display 110, one or more buttons 112, one or more vent structures 114, and the like) may be disposed in a frame and/or bezel such that one or more cut-outs within the first CFRTP sheet are not required.

The use of a CFRTP sheets (e.g., first CFRTP sheet 128, second CFRTP sheet 134) may provide a number of advantages over traditional oven doors. First and foremost, as noted previously herein, CFRTP sheets are very strong, and may be capable of producing oven doors 102 and other appliance doors which are stronger and lighter than traditional oven doors and other appliance doors. Additionally, CFRTP sheets (e.g., first CFRTP sheet 128) may be pre-colored. The ability to pre-color the first CFRTP sheet 128 defining the exterior surface of the oven door 102 allows for increased durability and life span of the oven 101, as a pre-colored CFRTP sheet will be more resistant to scratches and sink marks. Because there is no single thin layer which defines the color and appearance of the oven door 102, as is the case in traditional ovens, oven doors 102 formed with pre-colored CFRTP sheets may exhibit heightened scratch resistance. Similarly, the cost to produce ovens 101 may be reduced, in that the need for paint and paint repairs may be decreased.

In embodiments, the oven door 102 may include a layer which includes one or more ribbed structures. For example, as shown in FIG. 3, oven door 102 may include one or more ribbed structures 130 disposed on a surface of the first CFRTP sheet 128. In embodiments, the one or more ribbed structures 130 may be formed using one or more injection molding processes. In additional embodiments, the one or more ribbed structures 130 may include one or more recesses. For example, as shown in FIG. 3, the one or more ribbed structures 130 may be formed such that the layer including the one or more ribbed structures 130 includes one or more recesses. The one or more recesses within the one or more ribbed structures 130 may be configured to receive components of a latching mechanism of oven door 102. In this regard, various components of the oven door 102 latching mechanism (e.g., hinges, handles, latch rods, and the like) may be disposed within one or more recesses of the one or more ribbed structures. It is contemplated that the one or more recesses within the one or more ribbed structures 130 may be shaped and sized to tightly and securely receive the various components of the latching mechanism.

Figure 4:
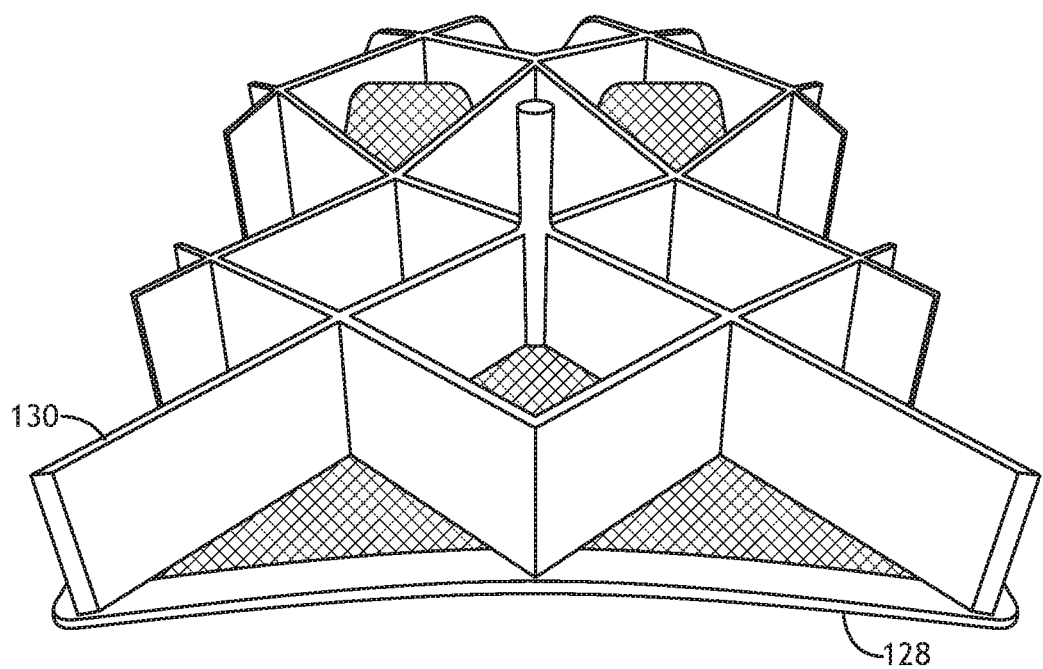
FIG. 4 illustrates a conceptual view of multiple layers of an oven door, in accordance with one or more embodiments of the present disclosure.

FIG. 4 illustrates a conceptual view of multiple layers of an oven door 102, in accordance with one or more embodiments of the present disclosure.

As shown in FIG. 4, one or more ribbed structures 130 may be disposed on a surface of the first CFRTP sheet 128. The one or more ribbed structures 130 may be formed using one or more injection molding processes. As noted previously herein, the one or more ribbed structures 130 may include one or more recesses configured to receive components of the oven door 102 including, but not limited to, the latching mechanism for the oven door 102.

Reference will again be made to FIG. 3. In embodiments, oven door 102 may include an insulating layer 132. The insulating layer 132 may be coupled to the one or more ribbed structures 130 using any coupling technique known in the art including, but not limited to, one or more adhesives. Additionally, the insulating layer may be coupled to the first CFRTP sheet 128 and/or the second CFRTP sheet 134. For example, the insulating layer 132 may be configured to fill spaces within the oven door 102 such that the insulating layer is coupled to at least two of the first CFTTP sheet 128, the one or more ribbed structures 130, or the second CFRTP sheet 134, thereby forming a sandwiched construction. The insulating layer 132 may include any insulating substance known in the art including, but not limited to, milled foam, expandable foam, and the like. The insulating layer 132 may be configured to fill any empty spaces or voids between the one or more ribbed structures in order to maximize the insulating properties throughout the oven door 102. Additionally, it is noted herein that the insulating layer 132 may additionally and/or alternatively include one or more recesses configured to receive components of the oven door 102 including, but not limited to, the latching mechanism for the oven door 102.

Oven door 102 may further include a second CFRTP sheet 134. The second CFRTP sheet 134 may define at least a portion of an interior surface of the oven door 102. In embodiments, the second CFRTP sheet 134 may be coupled to the insulating layer 132 using any coupling technique known in the art including, but not limited to, one or more adhesives. In an additional and/or alternative embodiment, the second CFRTP sheet 134 may be coupled directly to the one or more ribbed structures 130. Similarly, it is noted herein that alternative arrangements of the sandwiched construction of the oven door 102 are contemplated herein. For example, in an additional and/or alternative embodiment, the insulating layer 132 may be coupled to the first CFRTP sheet 128, and the one or more ribbed structures 130 may be disposed on the second CFRTP sheet 134.

In embodiments, the first CFRTP sheet 128 and the second CFRTP sheet 134 may be coupled to one another. Coupling the first CFRTP sheet 128 and the second CFRTP sheet 134 may be done to "seal" the oven door 102, or otherwise conceal the various layers of the oven door 102. For example, as shown in FIGS. 2B-2C, and in FIG. 3, the first CFRTP sheet 128 and/or the second CFRTP sheet 134 may be "bent" or "curved" around one or more side, top, or bottom surfaces of the oven door 102 such that the first CFRTP sheet 128 and the second CFRTP sheet 134 may be coupled together. For instance, as shown in FIG. 2C, the first CFRTP sheet 128 may be bent to form the side surface 126 and coupled to the second CFRTP sheet 134. In this regard, the first CFRTP sheet 128 and the second CFRTP sheet 134 may be coupled to one another along one or more surfaces of the oven door 102.

In addition to being stronger and lighter than traditional oven doors, oven doors 102 produced according to embodiments of the present disclosure may provide thermal insulation advantages over traditional oven doors. Due to the bonded, sandwiched construction shown in FIG. 3, thermal bridges may be reduced, and insulation may be increased throughout the oven door 102. In effect, this may lead to lower temperatures at the external surface of the oven door 102. Not only do lower external surface temperatures lead to safer ovens 101, but it also leads to heat conservation and energy savings.

Figure 5:
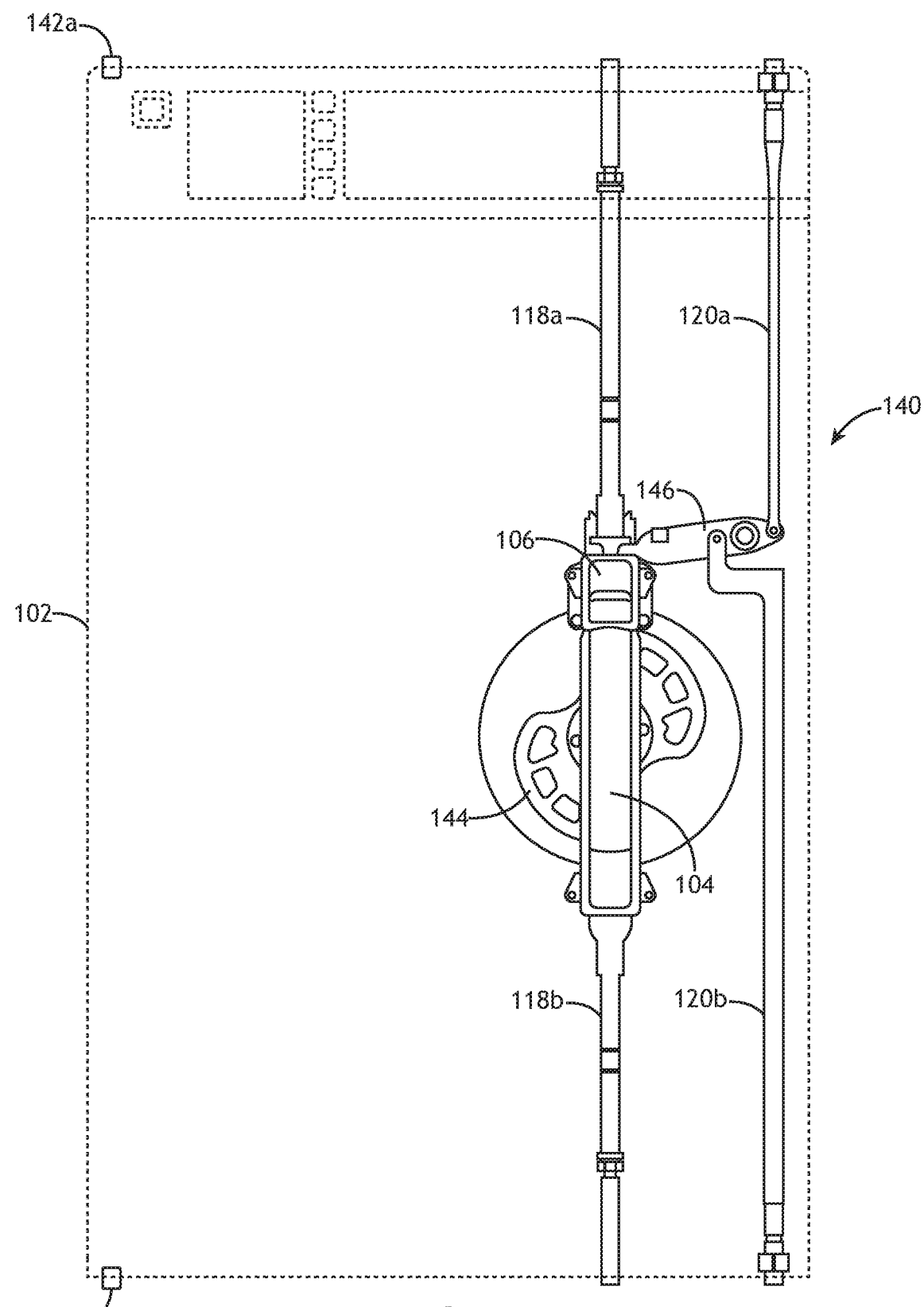
FIG. 5 illustrates a simplified conceptual view of a latching mechanism of an oven door.

FIG. 5 illustrates a simplified conceptual view of a latching mechanism 140 of an oven door 102. More specifically, FIG. 5 illustrates a latching mechanism 140 of a traditional aircraft galley oven door 102 configured to detachably secure the oven door 102 to an oven body 116.

As shown in FIG. 5, a traditional latching mechanism 140 of an aircraft galley oven door 102 may include a hinge assembly configured to hingedly couple the oven door 102 to the oven body 116. For example, the oven door 102 may include a hinge assembly including an upper hinge structure 142a and a lower hinge structure 142b. The upper hinge structure 142a and the lower hinge structure 142b may additionally and/or alternatively include a single hinge structure 142.

Continuing with reference to FIG. 5, the latching mechanism 140 of a traditional oven door 102 may include a primary latching mechanism and a secondary latching mechanism. The primary latching mechanism may include a first primary latch rod 118a and a second primary latch rod 118b, and the secondary latching mechanism may include a first secondary latch rod 120a and a second secondary latch rod 120b, as previously described with reference to FIG. 2C. The latch rods 118, 120 of the primary latching mechanism and the secondary latching mechanism may be configured to engage latching sites on the oven body 116 in order to retain the oven door 102 in a closed position. For example, upon actuation of the primary latch handle 104 (e.g., a user pulling and/or rotating the primary latch handle 104), a curved disc 144 may be configured to translate linear and/or rotary movement of the primary latch handle 104 into linear movement of the latch rods, thereby actuating the first and second primary latch rods 118a, 118b. Similarly, upon actuation of the secondary latch knob 106 (e.g., a user sliding the secondary latch knob 106 up or down), a lever 146 may be configured to actuate the first and second secondary latch rods 120a, 120b. It may be appreciated herein that actuation of the primary latch rods 118a, 118b and the secondary latch rods 120a, 120b may cause the latch rods 118a, 118b, 120a, 120b to engage or disengage latching sites on the oven body 116, and thereby allow the oven door to transition between the open position and the closed position, and vis versa.

Figure 6A:
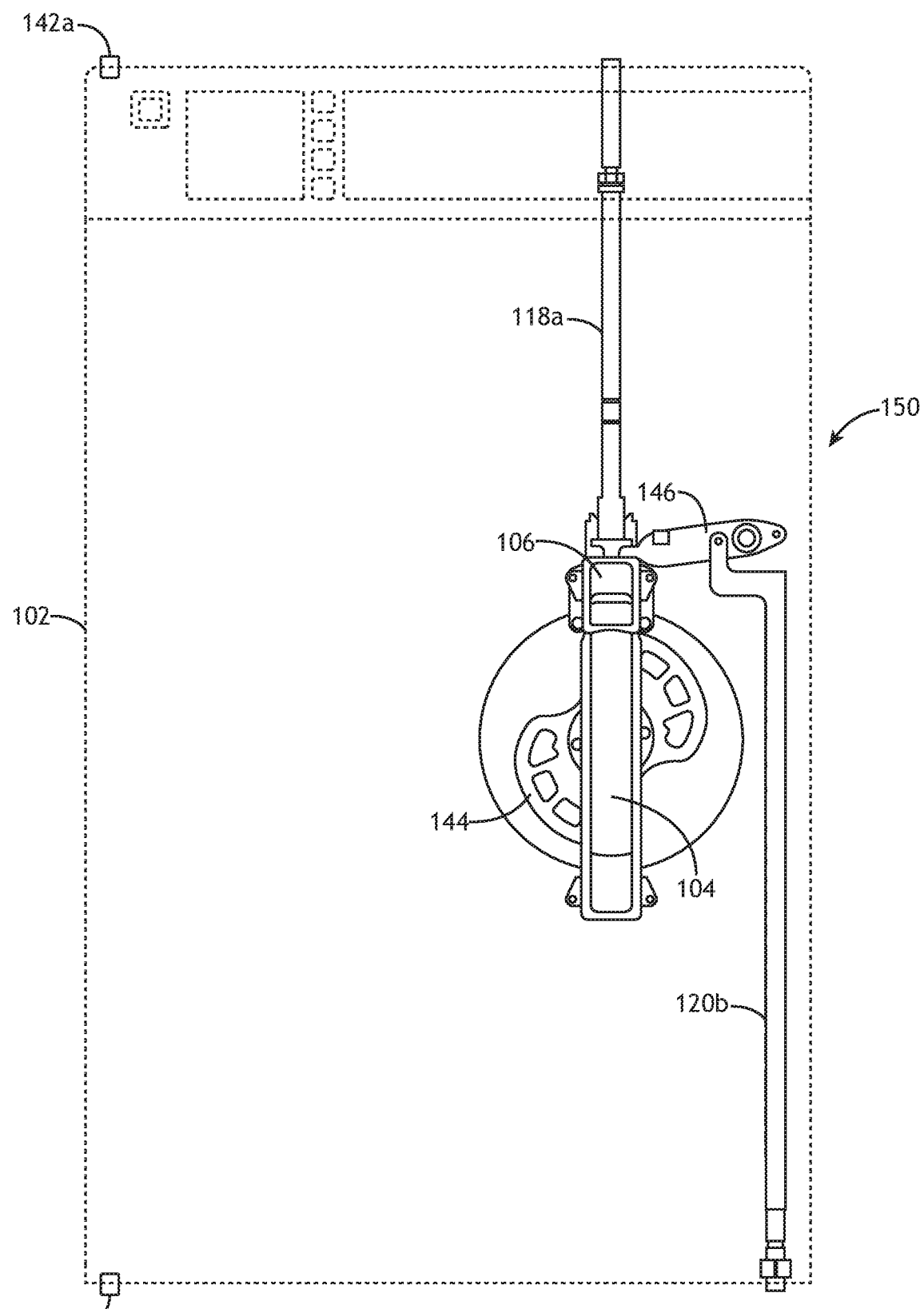
FIG. 6A illustrates a simplified conceptual view of a latching mechanism of an oven door, in accordance with one or more embodiments of the present disclosure.

FIG. 6A illustrates a simplified conceptual view of a latching mechanism 150 of an oven door 102, in accordance with one or more embodiments of the present disclosure. It is noted herein that any description shown and described in association with latching mechanism 140 depicted in FIG. 5 may be regarded as applying to latching mechanism 150 depicted in FIG. 6A, unless noted otherwise herein.

In embodiments, latching mechanism 150 is configured to detachably secure the oven door 102 to the oven body 116. Additionally, the dual-latching mechanism 150 (e.g., primary latching mechanism and secondary latching mechanism) may be configured to carry the loads of a crash and/or event individually. Thus, the dual-latching mechanism 150 is advantageous for purposes of redundancy. As noted previously herein, forming an oven door 102 with CFRTP sheets, according to embodiments of the present disclosure, may allow for the formation of an oven door 102 which is lighter and stronger than traditional oven doors. In this regard, it has been found that the lighter, stronger oven doors 102 of the present disclosure may be used in conjunction with latching mechanisms with fewer components than traditional oven doors. For example, traditional oven doors are exceedingly heavy, and require many points of contact between the oven door 102 and the oven body 116 to retain the heavy oven door 102 securely in a closed position. For instance, as shown in FIG. 5, the latching mechanism 140 of a traditional oven door 102 includes four points of contact between the oven door 102 and the oven body 116: a first primary latch rod 118a, a second primary latch rod 118b, a first secondary latch rod 120a, and a second secondary latch rod 120b.

Comparatively, it has been found that oven doors 102 formed with CFRTP sheets 128, 134 may be lighter and stronger than traditional oven doors, and thereby allow for a latching mechanism 150 with fewer points of contact between the oven door 102 and the oven body 116, while retaining the redundancy advantages of a dual-latching mechanism 150. For example, as shown in FIG. 6A, latching mechanism 150 of the present disclosure may include a primary latching mechanism including a single primary latch rod 118a, and a secondary latching mechanism including a single secondary latch rod 120b. In this regard, latching mechanism 150 may include a primary latch rod 118a configured to engage a latching site disposed on the oven body 116 proximate to an upper surface 122 of the oven door 102, and the secondary latch rod 120b configured to engage a latching site disposed on the oven body 116 proximate to a lower surface 124 of the oven door 102.

Weight savings is a crucial factor in the aircraft industry. Any weight savings in the production of aircraft components and equipment translates to improved aircraft fuel efficiency. Accordingly, embodiments of the present disclosure allow for a simplified latching mechanism 150 with fewer components than traditional latching mechanisms 140, thereby allowing for weight savings in producing aircraft galley ovens 101, and overall improved aircraft fuel efficiency.

Figure 6B:
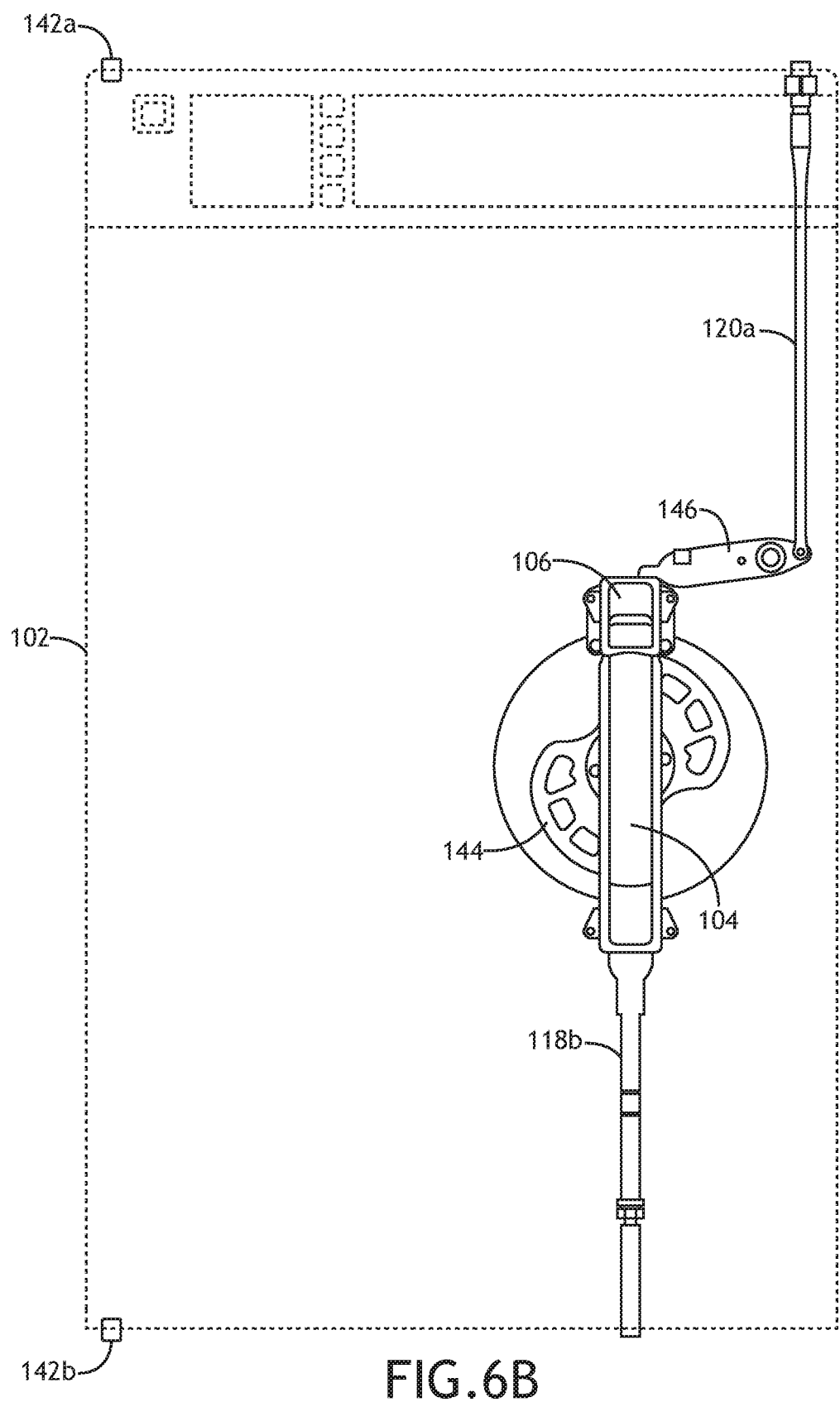
FIG. 6B illustrates a simplified conceptual view of a latching mechanism of an oven door, in accordance with one or more embodiments of the present disclosure.

FIG. 6B illustrates a simplified conceptual view of a latching mechanism of an oven door, in accordance with one or more embodiments of the present disclosure. It is noted herein that any description shown and described in association with latching mechanism 140 depicted in FIG. 5 and latching mechanism 150 depicted in FIG. 6A may be regarded as applying to latching mechanism 150 depicted in FIG. 6B, unless noted otherwise herein.

In additional and/or alternative embodiments, latching mechanism 150 of may include a primary latching mechanism including a single primary latch rod 118b, and a secondary latching mechanism including a single secondary latch rod 120a. In this regard, latching mechanism 150 may include a primary latch rod 118b configured to engage a latching site disposed on the oven body 116 proximate to an lower surface 124 of the oven door 102, and the secondary latch rod 120a configured to engage a latching site disposed on the oven body 116 proximate to an upper surface 122 of the oven door 102.

Figure 7:
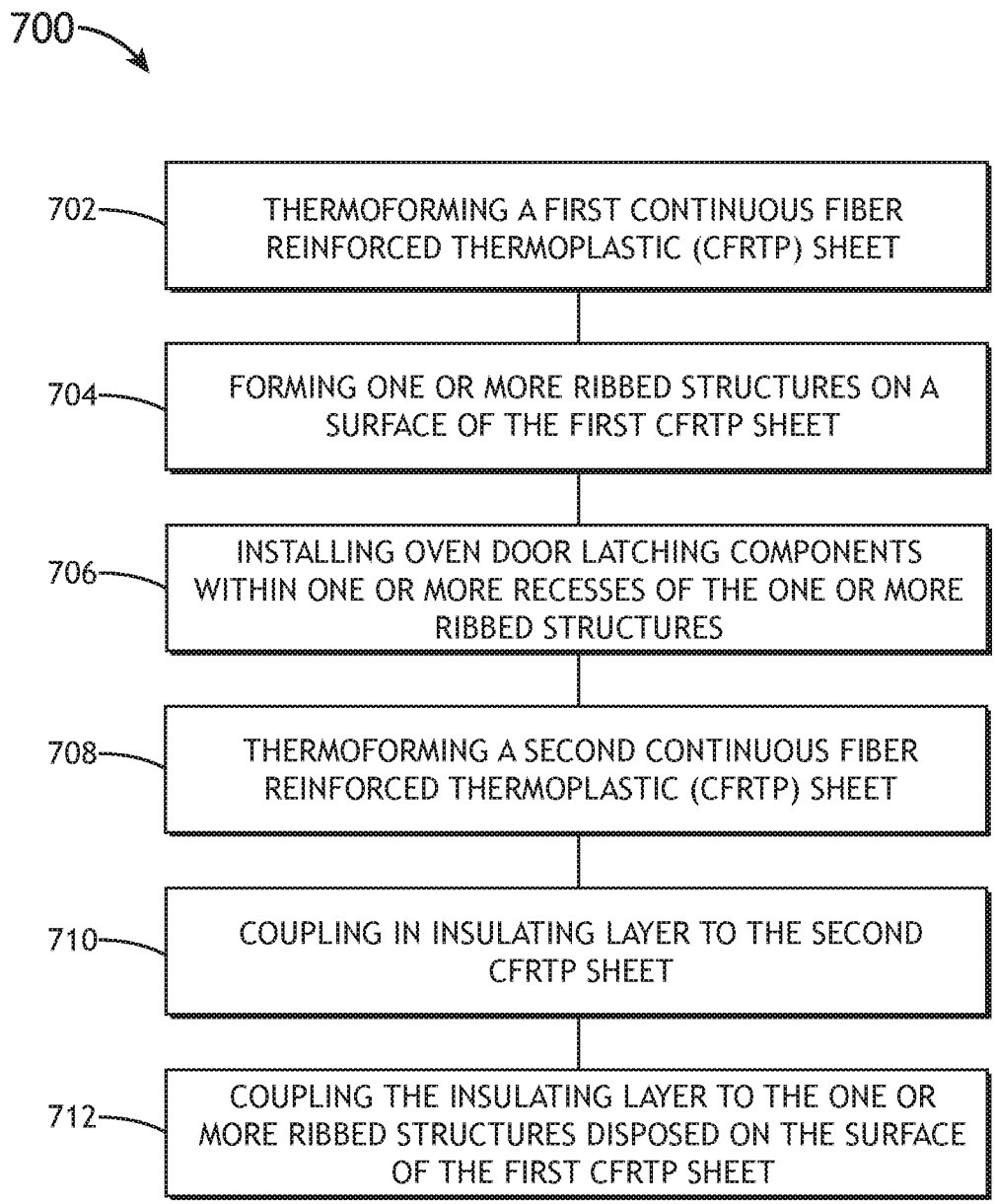
FIG. 7 illustrates a flowchart of a method for fabricating an oven door, in accordance with one or more embodiments of the present disclosure.

FIG. 7 illustrates a flowchart of a method 700 for fabricating an oven door 102, in accordance with one or more embodiments of the present disclosure.

In a step 702, a first CFRTP sheet is thermoformed. For example, the first CFRTP sheet 128 and the second CFRTP sheet 134 may be fabricated into preformed, custom, bespoke shapes using one or more thermoforming processes. Continuous fiber reinforced thermoplastics (CFRTP) sheets 128, 134 may include sheets of thermoplastic resins (e.g., polyetherimide thermoplastic) including continuous glass fibers and/or carbon fibers.

In a step 704 one or more ribbed structures are formed on a surface of the first CFRTP sheet. For example, the one or more ribbed structures 130 may be formed on a surface of the first CFRTP sheet 128 using one or more injection molding processes. The one or more ribbed structures 130 may be formed such that the layer including the one or more ribbed structures 130 includes one or more recesses configured to receive components of a latching mechanism of oven door 102.

In a step 706, oven door latching components are installed within one or more recesses of the one or more ribbed structures. For example, various components of a latching mechanism 150 (e.g., primary latch rods 118, secondary latch rods 120, hinged structures 142, curved disc 144, lever 146) may be installed within one or more recesses within the one or more ribbed structures 130.

In a step 708, a second CFRTP sheet is thermoformed. In additional and/or alternative embodiments, it is contemplated herein that the first CFRTP sheet 128 and the second CFRTP sheet 134 may be formed at the same time. For example, a single CFRTP sheet may be thermoformed, and the first CFRTP sheet 128 and the second CFRTP sheet 134 may be cut or otherwise formed from the single CFRTP sheet.

In a step 710, an insulating layer is coupled to the second CFRTP sheet. For example, the insulating layer 132 may be coupled to the second CFRTP sheet 134 using one or more adhesives. The insulating layer 132 may include any insulating substance known in the art including, but not limited to, milled foam, expandable foam, and the like.

In a step 712, the insulating layer is coupled to the one or more ribbed structures. For example, the insulating layer 132 may be coupled to the one or more ribbed structures 132 using one or more adhesives. As noted previously herein, additional and/or alternative arrangements of the sandwiched construction of the oven door 102 may be used without departing from the spirit and scope of the present disclosure.

While method 700 is described in the context of fabricating an oven door 102, this is not a limitation of the present disclosure, unless noted otherwise herein. In this regard, it is contemplated that embodiments of the present disclosure may be implemented in the context of additional and/or alternative appliances including, but not limited to, microwaves, refrigerators, and the like.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein. Furthermore, it is contemplated that the various steps of the method described above are not limited to the order shown and described, unless noted otherwise herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An aircraft galley oven, comprising:
   an oven body; and
   an oven door hingedly coupled to the oven body, the oven door including:
   a first continuous fiber reinforced thermoplastic (CFRTP) sheet defining at least a portion of an exterior surface of the oven door;
   a second CFRTP sheet defining at least a portion of an interior surface of the oven door;
   one or more ribbed structures disposed on at least one of the first CFRTP sheet or the second CFRTP sheet;
   an oven door latching mechanism disposed within one or more recesses within the one or more ribbed structures;
   an insulating layer coupled to at least one of the one or more ribbed structures; and
   said insulating layer and door latching mechanism sandwiched between said first and said second sheets in spaced apart relation, said at least one structural rib and insulation layer reducing thermal bridging between said interior and exterior surfaces of said oven door.

2. The aircraft galley oven of claim 1, wherein the first CFRTP sheet is coupled to the second CFRTP sheet.

3. The aircraft galley oven of claim 2, wherein the first CFRTP sheet includes one or more cut-outs configured to receive at least one of a display or a button.

4. The aircraft galley oven of claim 1, wherein at least one of the first CFRTP sheet and the second CFRTP sheet are between 0.4 mm and 5.1 mm thick.

5. The aircraft galley oven of claim 1, wherein at least one of the first CFRTP sheet and the second CFRTP sheet comprise CETEX sheets.

6. The aircraft galley oven of claim 1, wherein the one or more ribbed structures are disposed on at least one of the first CFRTP sheet or the second CFRTP sheet via one or more injection molding processes.

7. The aircraft galley oven of claim 1, wherein the insulating layer comprises a layer of milled foam.

8. The aircraft galley oven of claim 1, wherein the insulating layer is coupled to the one or more ribbed structures with an adhesive.

9. The aircraft galley oven of claim 1, wherein the latching mechanism is configured to detachably secure the oven door to the oven body.

10. The aircraft galley oven of claim 9, wherein the latching mechanism includes:

a primary latching mechanism comprising a single primary latch rod configured to engage a first latching site of the oven body; and a secondary latching mechanism comprising a single secondary latch rod configured to engage a second latching site of the oven body.

11. The aircraft galley oven of claim 10, wherein the first latching site is disposed on the oven body proximate to a top surface of the oven door, and the second latching site is disposed on the oven body proximate to a bottom surface of the oven door.

12. The aircraft galley oven of claim 10, wherein the first latching site is disposed on the oven body proximate to a bottom surface of the oven door, and the second latching site is disposed on the oven body proximate to a top surface of the oven door.

13. An aircraft galley device, comprising:

an oven door hingedly couplable to an oven body, the oven door including:
  a first continuous fiber reinforced thermoplastic (CFRTP) sheet;
  one or more ribbed structures disposed on the first CFRTP sheet;
  a second CFRTP sheet coupled to the one or more ribbed structures; and
  an oven door latching mechanism disposed within one or more recesses within the one or more ribbed structures, the oven door latching mechanism including a primary latching mechanism comprising a single primary latch rod configured to engage a latching site of the oven body; and
  said insulating layer sandwiched between said first and said second sheets in spaced apart relation, said at least one structural rib and insulation layer reducing thermal bridging between said interior and exterior surfaces of said oven door.

14. The aircraft galley device of claim 13, wherein the oven door latching mechanism further includes:

a secondary latching mechanism comprising a single secondary latch rod configured to engage an additional latching site of the oven body.

15. An appliance door, comprising:

an appliance door hingedly couplable to an appliance body, the appliance door including:
  a first continuous fiber reinforced thermoplastic (CFRTP) sheet;
  one or more ribbed structures disposed on the first CFRTP sheet;
  an appliance door latching mechanism disposed within one or more recesses within the one or more ribbed structures;
  an insulating layer coupled to the one or more ribbed structures; and
  a second CFRTP sheet coupled to the insulating layer; and
  said insulating layer sandwiched between said first and said second sheets in spaced apart relation, said at least one structural rib and insulation layer reducing thermal bridging between said interior and exterior surfaces of said oven door.

16. The appliance door of claim 15, wherein the first CFRTP sheet defines an exterior surface of the appliance door, and the second CFRTP sheet defines an interior surface of the appliance door.

17. The appliance door of claim 16, wherein the first CFRTP sheet includes one or more cut-outs configured to receive at least one of a display or a button.

18. The appliance door of claim 15, wherein at least one of the first CFRTP sheet and the second CFRTP sheet are between 0.4 mm and 5.1 mm thick.

19. The appliance door of claim 15, wherein at least one of the first CFRTP sheet and the second CFRTP sheet comprise CETEX sheets.

20. The appliance door of claim 15, wherein the one or more ribbed structures are disposed on the first CFRTP sheet via one or more injection molding processes.

* * * * *